July 28, 1953 G. X. LENS 2,647,166
SWITCHING MECHANISM
Filed Dec. 31, 1949 5 Sheets-Sheet 1

INVENTOR
GEORGES X. LENS
BY
ATTORNEY

July 28, 1953

G. X. LENS 2,647,166

SWITCHING MECHANISM

Filed Dec. 31, 1949

INVENTOR
GEORGES X. LENS

BY
ATTORNEY

July 28, 1953  G. X. LENS  2,647,166
SWITCHING MECHANISM
Filed Dec. 31, 1949  5 Sheets-Sheet 3
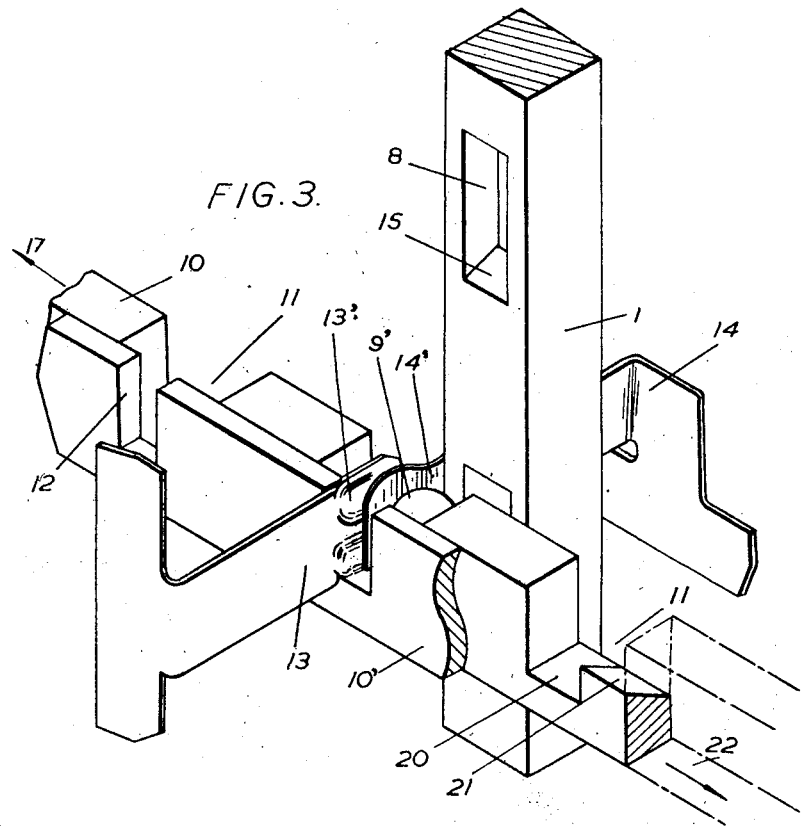
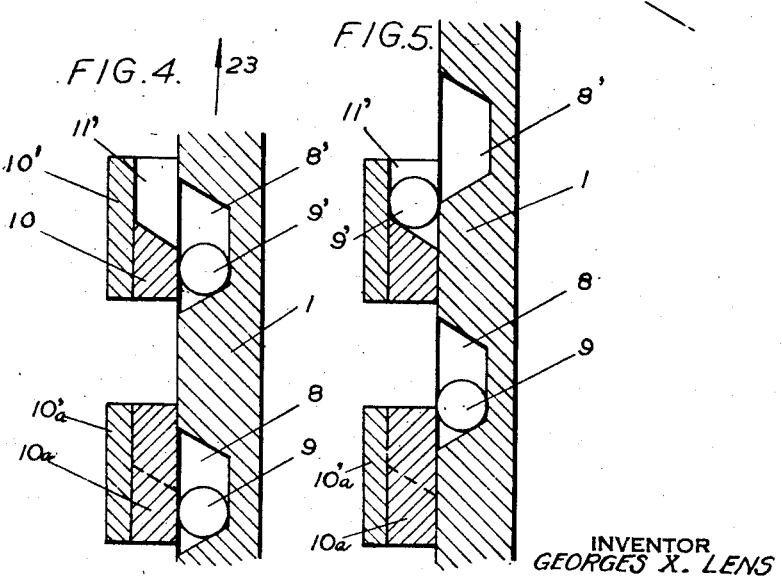
INVENTOR
GEORGES X. LENS
BY
ATTORNEY

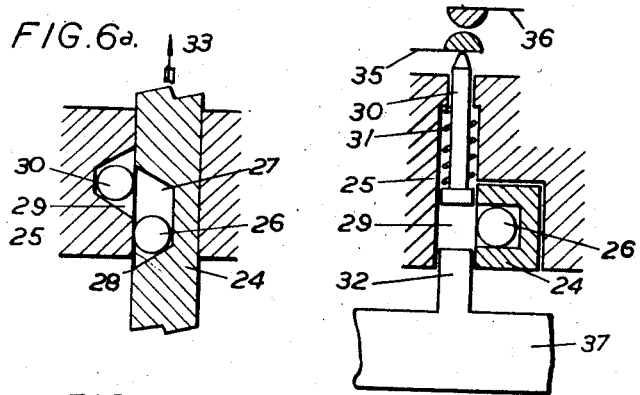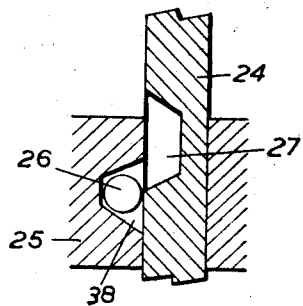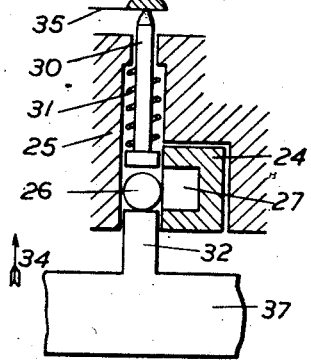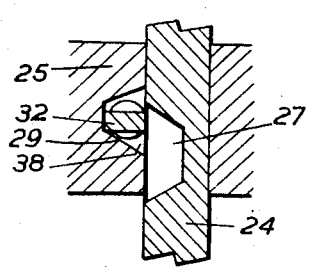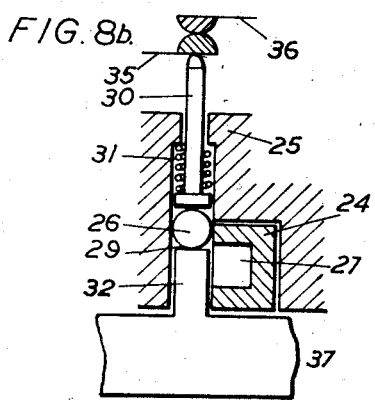

July 28, 1953 G. X. LENS 2,647,166
SWITCHING MECHANISM
Filed Dec. 31, 1949 5 Sheets-Sheet 5

INVENTOR
GEORGES X. LENS
BY
ATTORNEY

Patented July 28, 1953

2,647,166

UNITED STATES PATENT OFFICE 2,647,166

SWITCHING MECHANISM

Georges Xavier Lens, Antwerp, Belgium, assignor to International Standard Electric Corporation, New York, N. Y., a corporation of Delaware Application December 31, 1949, Serial No. 136,188
In France January 19, 1949

6 Claims. (Cl. 179—27.54)

1

The present invention relates to a commutating mechanism for electric circuits. More particularly, it may be used for providing a switch of the crossbar type having combined multiple terminals such as the selector switches used in telecommunication, remote control, telesignalling installations or similar installations.

According to a characteristic of this invention a movable member is used which is adapted to be displaced vertically by a translator bar and which as a result of this displacement occupies such a position that it is dependent on a horizontal clutching bar, in which this movable member, during the displacement of the said horizontal bar abuts directly or indirectly against connecting elements controlling electric circuits.

According to another feature of the invention when a movable member has been displaced by a horizontal bar it is made independent of the movement of the vertical bar with which it is associated and that when the horizontal bar is restored to its rest position, the movable member automatically returns to the position where it is dependent upon the vertical bar.

In accordance with a further feature of the invention the said movable member may either consist of a metallic ball and operating bars consisting wholly or partly of non-conducting material or a ball made of non-conducting material and bars of a metallic nature.

Other features will be clear from the following description which is given merely for illustrative purposes, with reference to the attached drawings wherein:

Fig. 3 is a perspective view of the mechanism shown in Fig. 1 in which the vertical bar has been restored to its rest position, the horizontal bar being shown in its operative position and the ball being in a position to control the electric circuit.

Fig. 4 shows a vertical cross-section of a commutating mechanism comprising a vertical bar associated with two horizontal bars in which the vertical bar is shown in its rest position;

Fig. 5 shows the mechanism of Fig. 4 but the vertical bar is now shown in the operative position;

Figs. 6a, 7a and 8a show a vertical cross-section of a modification of the embodiment shown in Figs. 1 to 5, wherein the mechanism is shown respectively in the rest position, further with the vertical bar in the operative position and finally with the vertical bar restored to the rest position and the horizontal bar in the operative position;

Figs. 6b, 7b, 8b represent plan views of Figs. 6a, 7a, 8a respectively; and

ihrepre

Figure 1:
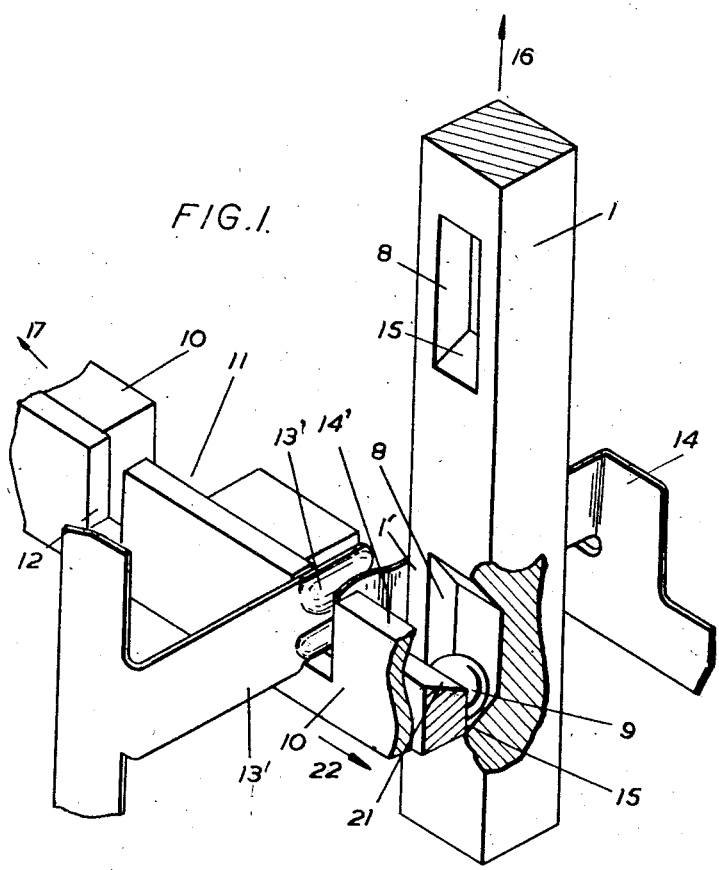
Fig. 1 shows a ball commutating mechanism, with the bars shown in their rest position.
Figure 2:
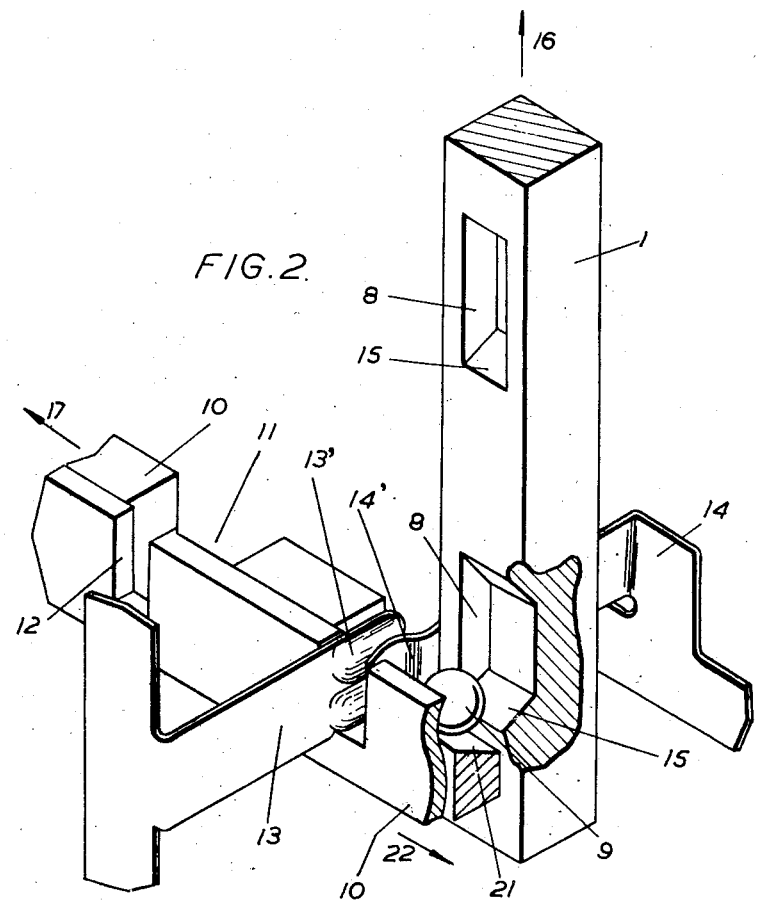
Fig. 2 is a perspective view of the mechanism shown in Fig. 1, with the vertical bar shown in its operative position.

Considering now Figs. 1 to 3 it may be seen that the commutating mechanism comprises a translator bar 1 of insulating material adapted to be displaced vertically. In this bar, cavities such as 8 are provided to accommodate movable members such as 9 formed by metallic balls. The lower part of these cavities 8 is formed with an inclined surface 15.

A clutching bar 10 of insulating material is operatively positioned to be displaced horizontally and is provided with recesses such as 11. The bottom of these recesses is formed with a horizontal part 20 Fig. 3 and an inclined part 21. End portions 13' and 14' of springs 13 and 14 are disposed within the part 20, whose width is such that during the displacement of the bar 10, the side of the inclined portion 21 Fig. 3 is maintained out of contact with the end 14' of the spring 14. The inclined portion 21 is adapted to receive the ball 9, as will be explained hereinafter.

The ends 13' and 14' of the springs 13 and 14 are supported inside notches such as 12 provided in a fixed piece 10'.

The springs 13 and 14 are mounted on a stationary support (not shown). These springs may be formed by first cutting from a tape of a non-insulating alloy and then bending the tape in the desired manner.

In the position shown in Fig. 1 the vertical and horizontal bars are in their rest position and the ball 9 lies in its cavity of the vertical bar 1.

Let us assume that the vertical bar 1 has been displaced in the direction indicated by the arrow 16 so that it has reached the position shown in Fig. 2.

During displacement of the bar 1, the ball 9 is carried along and when the inclined surface 15 arrives at the same height as the recess in the horizontal bar, this ball will roll down the inclined surface and will then occupy the position shown in Fig. 2.

If the clutching bar 10 is thereupon displaced in the direction of the arrow 17, the ball 9 will be carried along and will displace the end 14' of the movable spring 14 in order to bring it into contact with the end 13' of the spring 13. An electrical circuit may be controlled through the action of the contacting portions 13' and 14' of spring 13 and 14. The displacement of the bar 19 is such as to provide the desired pressure between the contacts 13' and 14'.

If the vertical bar returns to its rest position while the horizontal bar is in the operative position, the ball 9 will be held in its operative position inside its recess in the horizontal bar 10 by the stationary piece 19' and by the edge 1' of the vertical bar 1, the inclined portion 21 of the recess for the ball no longer facing the cavity 8 of the vertical bar as clearly shown in Fig. 3.

When the horizontal bar 10 is restored to its rest position (displacement in the direction of the arrow 22) the ball 9 will no longer engage the end 14' of the spring 14 and the contact between 13' and 14' will be opened. When the inclined portion 21 arrives in front of the cavity 8, the ball 9 will roll down along the inclined portion and fall back into its cavity 8 to resume its position as shown in Fig. 1.

It is clear that within the scope of this invention the displacement of the ball 9 by the horizontal bar may be utilized for operating a plunger member or any other suitable device acting upon the contact springs to effect the closure or opening of the electric circuits controlled thereby.

Furthermore it is evident that by combining a certain number of horizontal and vertical bars it will be possible to build a multi-commutator of the cross-bar type adapted to establish interconnections between multiple banks arranged in the horizontal and vertical directions.

Referring now to Figs. 4 and 5 it may be seen that when the lower horizontal bar 10a is in the operative position during the displacement of a vertical bar, the ball 9 will be held in its cavity in the vertical bar.

In Fig. 4 it is assumed that the vertical bar 1 is in the rest position while the lower horizontal bar 10a is in the operative position and the upper horizontal bar 10 in its rest position.

It will be assumed that the vertical bar 1 is displaced in the direction of the arrow 23 in order to move to the position shown in Fig. 5. It will be seen that as a result of this displacement of the bar 1, the ball 9' has dropped into the cavity 11' in the bar 10 as has been explained above. However, the ball 9 is held inside the cavity 8 by the right hand lateral edge of the lower bar 10a. In this manner, an independency of movement of the vertical bars with respect to the horizontal bars in the operative position will be obtained, thus permitting the use of the same vertical bar for selectively operating contact controls on several horizontal bars.

The operation of the commutating mechanism shown in Figs. 6a to 8b will now be explained.

This commutating mechanism comprises a vertical bar 24 (Fig. 6a) adapted to slide within a stationary piece 25. In this vertical bar there are provided a plurality of spaced cavities 27 (of which only one is shown in the drawing) for the balls 26. The lower portion of these cavities is formed with an inclined surface 28.

The stationary piece 25 has a recess 29 (Fig. 6b) inside of which there is located a bolt 30 with a shoulder on which a restoring spring 31 is positioned. The horizontal bar 37 comprises a plunger 32 the end of which is normally engaged in the recess 29.

In the rest position of the horizontal and vertical bars, the various members occupy the position shown in Figs. 6a and 6b. The ball 26 lies in the cavity 27 of the vertical bar 24.

It will be assumed that the vertical bar is displaced in the direction of the arrow 33 and will then occupy a position as shown in Figs. 7a and 7b.

The ball 26 which has been carried along by the vertical bar 24 drops, rolling down the inclined surface 28 into the recess 29 and will take up the position shown in Figs. 7a and 7b.

The horizontal bar 37 is now moved in the direction of the arrow 34 and will occupy a position shown in Figs. 8a and 8b.

During its displacement the bar 37, by means of the plunger 32, will displace the ball 26 abutting the bolt 30, and compressing the spring 31. The end of the bolt 30 operates the movable spring 35 to close the contact with the stationary spring 36.

At the end of the displacement of the horizontal bar 37, the various members occupy the position shown in Fig. 8b.

It will be seen that if, with the horizontal bar 37 resting in its operative position, the vertical bar 24 is restored to its rest position, the ball is held in the recess 29 and cannot drop again in the cavity 27 in the said vertical bar.

When the horizontal bar 37 returns to the rest position the plunger 32 is withdrawn from the recess 29; the ball 26 is thereupon displaced by the bolt 30 pressed back by the action of spring 31. As soon as the ball 26 arrives in front of the cavity 27 it will roll down along the inclined surface 38 of the recess 29 and fall back into the cavity 27 of the bar 24. The various members are now again in the position shown in Figs. 6a and 6b.

Figure 9:
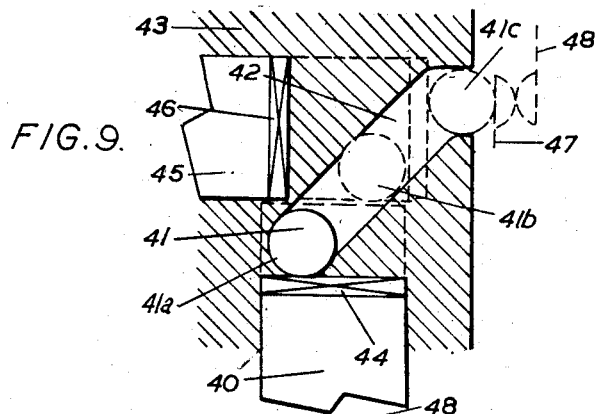
Figs. 9 to 11 represent three other modifications of a ball commutating mechanism.
Figure 10:
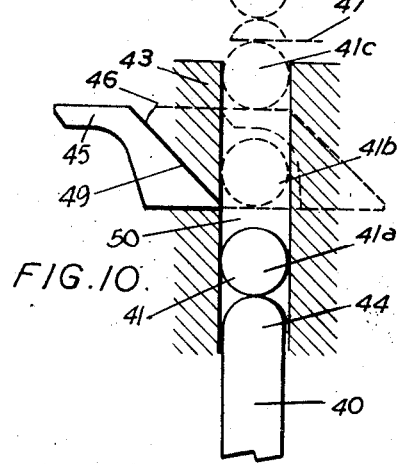
Figure 11:
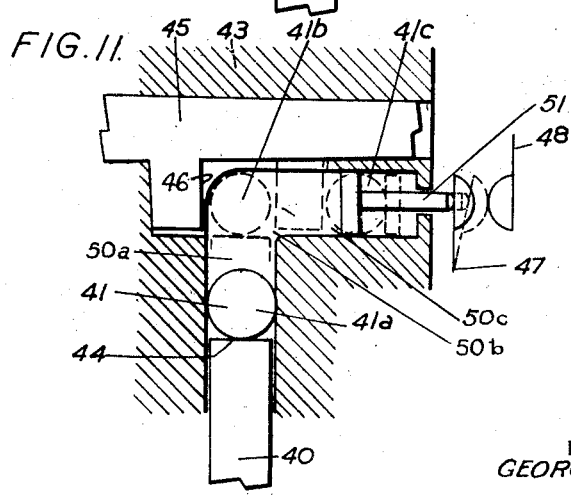

Figs. 9, 10 and 11 show three different modifications according to the same working principle.

The vertical bars 40 and the horizontal bars 45 may slide within a stationary piece 43. The ball 41 may be lifted into a transfer slot 42 by the action of a driving member 44 belonging to the vertical bar 40.

In the rest position the ball will occupy the position 41a.

When the bar 40 is operated the ball is carried to position 41b. The movement of the horizontal bar 45 will displace the ball by the action of the driving member 46 and take it into the position 41c. In this position the ball will effect the displacement of the movable contact 47 and thus close the contacts 47—48.

If the vertical bar 40 is restored into the rest position, the ball is held in the position 41c, by the action of the horizontal bar 45.

When the horizontal bar 45 is restored to the rest position, the ball is released and displaced within the transfer slot so as to resume the position 41a.

In the modification shown in Fig. 10, the horizontal bar 45 is provided with an inclined end portion 49, which portion upon movement of the bar 45 in the right-hand direction, forces the ball, when in the position 41b, to rise up in the transfer slot 50. The ball then assumes the position 41c and causes displacement of contact 47.

In the modification shown in Fig. 11, the horizontal bar 45 is provided with a projecting lug portion 46a. The transfer slot 50a is angularly shaped so that when vertical bar 40 forces the ball up the vertical portion 50a of slot 50b, the lug 46a may force the ball from its position at 41b along the horizontal portion 50c of slot 50b to assume the position 41c where it urges the interponent member 51 to the right to cause displacement of contact 47 as shown in dotted line.

It is obvious that within the scope of this invention, it will be possible to use non-conductive balls together with metallic bars or metallic balls together with bars certain portions of which are made of materials which do not conduct electricity.

While I have described above the principles of my invention in connection with specific apparatus, it is to be clearly understood that this description is made only by way of example and not as a limitation to the scope of my invention.

What is claimed is:

1. A switching mechanism for telecommunication systems comprising a translator bar operatively positioned for movement in a first plane, a clutching bar operatively positioned adjacent said translator bar for movement in a plane substantially at right angles to said first plane, means for actuating said translator and clutching bars for predetermined movements in said respective planes, said translator bar having a cavity therein, a ball normally held in said cavity, said clutching bar being provided with a similar cavity positioned adjacent said translator bar whereby said predetermined movement of said translator bar is operative to transfer said ball to the cavity in said clutching bar, a plurality of spring contacts associated with said clutching bar and means controlled by said predetermined movement of said clutching bar for controlling said spring contacts by said ball.

2. The switching mechanism as set forth in claim 1 wherein said spring contacts are mounted within the cavity in said clutching bar, said ball when received in the cavity of said clutching bar being operative upon said predetermined movement of said clutching bar to actuate said contacts.

3. The switching mechanism as set forth in claim 2 wherein the cavities in said translator and clutching bars are provided with slanting surfaces positioned to allow movement of said ball between respective cavities upon said predetermined movements of said bars.

4. A switching mechanism for telecommunication systems comprising a plurality of translator bars operatively positioned for movement in a first plane, a plurality of clutching bars operatively positioned adjacent respective of said translator bars for movement in a plane substantially at right angles to said first plane, means for actuating said translator and clutching bars for predetermined movements in said respective planes, said translator bars being positioned common to a plurality of said clutching bars, a plurality of balls, said translator bars having cavities therein for normally holding said balls, said clutching bars being provided with a plurality of similar cavities positioned adjacent said translator bars, whereby said predetermined movement of said translator bar is operative to transfer certain of said balls to the cavities in said clutching bars, a plurality of spring contacts associated with said clutching bars and means controlled by said predetermined movements of said clutching bars for controlling said spring contacts by said balls.

5. The switching mechanism as set forth in claim 4 wherein said spring contacts are mounted within the cavities in said clutching bars, said balls when received in said cavities of said clutching bars being operative upon said predetermined movement of said clutching bars to actuate said contacts.

6. A switching mechanism for telecommunication systems comprising a first member having a first cavity therein, said cavity having a bottom surface slanting downwardly, said first member operatively positioned for movement in a first plane, a second member having a second cavity therein, said second cavity having a bottom surface slanting downwardly, said second member operatively positioned for movement in a plane substantially at right angles to the first plane, each of said first and second members having a rest position and an operated position, separate means for actuating said first and second members for movements between said rest and operated positions, said cavities located to be in register upon movement of said second member toward its operated position, a plurality of contacts for closing and opening electrical circuits, a freely movable ball normally held within said second cavity while said second member is in its rest position, said ball adapted to roll down the bottom surface of said second cavity into said first cavity upon movement of said second member from its rest position toward its operated position while said first member is in its rest position, a side of said first cavity located to urge said ball to control said contacts upon the subsequent movement of said first member to its operated position.

GEORGES XAVIER LENS.

References Cited in the file of this patent

UNITED STATES PATENTS

| Number | Name | Date |
|---|---|---|
| 2,127,322 | Blomberg | Aug. 16, 1938 |
| 2,349,279 | Holden | May 23, 1944 |
| 2,438,042 | Edgarton | Mar. 16, 1948 |
| 2,499,553 | Wiberg | Mar. 7, 1950 |
| 2,516,772 | Hickman | July 25, 1950 |
| 2,541,345 | Graybill | Feb. 13, 1951 |